W. GETHMANN.
LEVEL.
APPLICATION FILED OCT. 26, 1914.

1,166,045.

Patented Dec. 28, 1915.

Witnesses
F. B. Wooden
Marian Moore

William Gethmann
Inventor
by C. A. Snow & Co.
Attorneys

UNITED STATES PATENT OFFICE.

WILLIAM GETHMANN, OF OKLAHOMA, OKLAHOMA.

LEVEL.

1,166,045.  Specification of Letters Patent.  Patented Dec. 28, 1915.

Application filed October 26, 1914. Serial No. 868,661.

*To all whom it may concern:*

Be it known that I, WILLIAM GETHMANN, a citizen of the United States, residing at Oklahoma city, in the county of Oklahoma and State of Oklahoma, have invented a new and useful Level, of which the following is a specification.

The device forming the subject matter of this application is a level, and the invention aims to provide novel means for anchoring the vial carried indicator and for controlling the movement thereof.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

Figure 1:
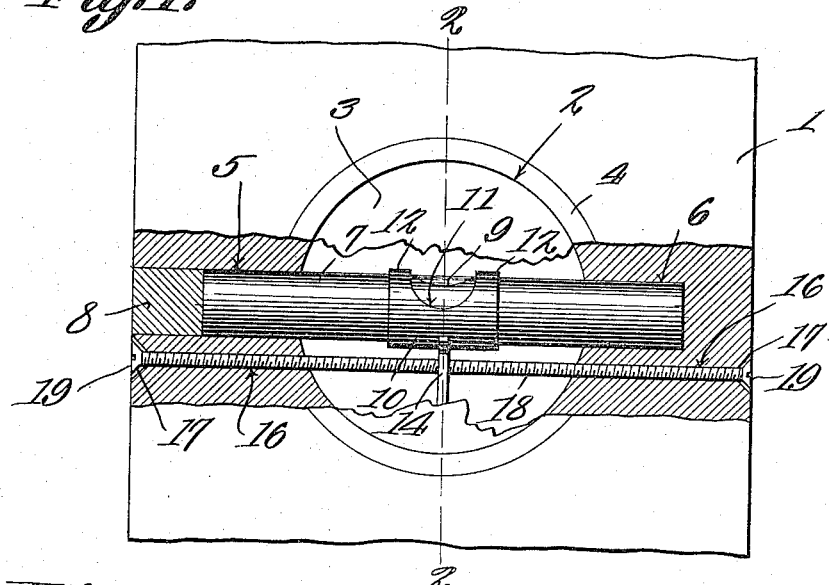
Figure 2:
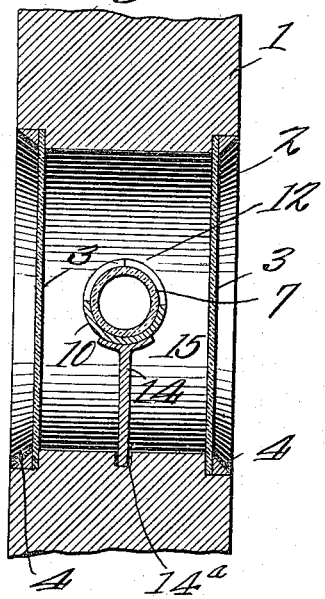

In the accompanying drawings: Figure 1 shows in side elevation, a level constructed in accordance with the present invention, parts being broken away; Fig. 2 is a section on the line 2—2 of Fig. 1.

In the drawings, the numeral 1 designates the body or stock of a level having an opening 2 therethrough. The ends of the opening 2 are closed by transparent plates 3 held in place by retaining rings 4 or in any other suitable manner. Projecting into the body or stock 1 of the level from one side of the opening 2 is a recess 6, and disposed opposite to the recess 6 is a passage 5 extended outwardly to the exterior edge of the stock 1. A vial 7 is inserted into the passage 5 and the recess 6 and may be held in place by means of a plug 8 inserted into the outer end of the passage 5, the plug, if desired, being in the form of a mass of cement. The bubble of the vial 7 is indicated at 9.

An indicator 10 is mounted to reciprocate upon the vial 7. The indicator 10 may be of any desired form, but in the present instance is shown as shaped from a sheet of metal or other material, cut away at its ends as shown at 11, to define pairs of oppositely disposed arms 12. The indicator surrounds the vial 7 closely and grips the same with a frictional contact, the bubble 9 being disposed between the pairs of arms 12, as Fig. 1 will clearly show. Projecting downwardly from the indicator 10 is an anchoring means represented by a resilient finger 14, which if desired, may be terminally inserted into a hole 14ª in the stock 1.

The indicator 10 grips the vial 7 with sufficient friction so as not to slide readily thereon, but a means is provided whereby, at the will of the operator, the indicator 10 may be moved longitudinally of the vial 7. With this end in view, opposed bores 16 are formed in the stock 1 of the level, upon opposite sides of the opening 2, and into the bores 16 are threaded screws 18, the heads 19 of which are received in the countersunk recesses 17 formed at the outer ends of the bores 16. The inner ends of the screws 18 bear upon the finger 14, and it will be obvious that by successively rotating the screws 18, the position of the indicator 10 may be changed, thereby effecting the necessary adjustment and, it is to be noted, effecting the adjustment in question without removing the transparent plates 3 which shield and house in the level vial 7.

Having thus described the invention, what is claimed is:—

1. A mechanic's level embodying a stock; a vial carried by the stock; an indicator slidable with respect to the vial and including an anchoring means engaging the stock; and means for moving the indicator.

2. A mechanic's level embodying a stock; a vial carried by the stock; an indicator slidable with respect to the vial and including a bendable finger one end of which is held in the stock; and means for moving the indicator.

3. A mechanic's level embodying a stock; a vial carried by the stock; an indicator slidable with respect to the vial and including a bendable finger one end of which is held in the stock; and stock carried means engaging the finger to move the indicator.

In testimony that I claim the foregoing as my own, I have hereto affixed my signature in the presence of two witnesses.

WILLIAM GETHMANN.

Witnesses:
 JOHN H. STEWART,
 J. D. COOPER.

Copies of this patent may be obtained for five cents each, by addressing the "Commissioner of Patents, Washington, D. C."